(12) United States Patent
Hall

(10) Patent No.: US 8,612,384 B2
(45) Date of Patent: Dec. 17, 2013

(54) METHODS AND APPARATUS FOR SEARCHING AND ACCESSING MULTIMEDIA CONTENT

(76) Inventor: Michael Andrew Hall, Melbourne (AU)

(*) Notice: Subject to any disclaimer, the term of this patent is extended or adjusted under 35 U.S.C. 154(b) by 412 days.

(21) Appl. No.: 12/416,365

(22) Filed: Apr. 1, 2009

(65) Prior Publication Data
US 2009/0254578 A1 Oct. 8, 2009

Related U.S. Application Data (60) Provisional application No. 61/041,832, filed on Apr. 2, 2008.

(51) Int. Cl.
*G06F 7/22* (2006.01)
*G06F 7/10* (2006.01)

(52) U.S. Cl.
USPC .......................................... 707/610; 715/203

(58) Field of Classification Search
None
See application file for complete search history.

(56) References Cited

U.S. PATENT DOCUMENTS

| | | | |
|---|---|---|---|
| 6,199,076 B1* | 3/2001 | Logan et al. | 715/203 |
| 2006/0074690 A1* | 4/2006 | Xu et al. | 704/276 |
| 2008/0005656 A1* | 1/2008 | Pang et al. | 715/500.1 |

* cited by examiner

*Primary Examiner* — Ajay Bhatia
*Assistant Examiner* — Miranda Huang
(74) *Attorney, Agent, or Firm* — Crawford Maunu PLLC (57) ABSTRACT

A method of synchronizing a multimedia content file with an associated text file includes subdividing the text file into one or more samples, where each sample includes zero or more consecutive characters of the text file. The samples are associated with a corresponding contiguous time interval of the multimedia content file. For each sample, a corresponding consumption rate value is determined, which represents a use ratio of characters of the sample within the associated time interval of the multimedia content file. The consumption rate values are then stored, so that they may subsequently be used to compute time positions within the multimedia content file associated with corresponding text characters within the text file. Additional information, such as time cues and interlude intervals, may also be recorded in order to improve the accuracy of synchronization. A corresponding method for cueing of playback of a multimedia content file to its associated text is also provided, along with computer-implemented and networked apparatus implementing the synchronization, cueing and playback methods.

16 Claims, 4 Drawing Sheets

METHODS AND APPARATUS FOR SEARCHING AND ACCESSING MULTIMEDIA CONTENT

RELATED PATENT DOCUMENTS

This patent document claims the benefit, under 35 U.S.C. §119(e), of U.S. Provisional Patent Application Ser. No. 61/041,832 filed on Apr. 2, 2008, and entitled "Methods and Apparatus for Searching and Accessing Multimedia Content," which is fully incorporated herein by reference.

FIELD OF THE INVENTION

The present invention relates to management and use of multimedia resources, and more particularly to methods and apparatus for searching and accessing information content within multimedia files.

BACKGROUND OF THE INVENTION

Multimedia resources, including audio and video files, are becoming increasingly important as sources of information, communication and entertainment. For example, whereas the Internet originally provided primarily text-based communication and information services, this has evolved over time to include not only still images, but also multimedia content, including audio, video and other rich media resources. Popular Web sites such as YouTube facilitate the publication of multimedia content by all users, and audiovisual material posted to such sites ranges from personal diary and commentary, through current events and political footage, to educational and informative content, and everything in between. In general, multimedia content, delivered via the Internet and other channels, is increasingly being utilised for purposes of education, information, advertising, entertainment and so forth.

One problem raised by this proliferation of multimedia content is the difficulty of identifying particular multimedia resources, and/or portions thereof, that are of particular value or interest to users. This may be appreciated by considering the comparative maturity of text-based information systems. Text-based searches, including search facilities of databases and other information resources, as well as Internet search engines such as Google, enable the rapid identification of documents of interest, and of particular portions within those documents, particularly by reference to specified search terms or keywords. Presently, no similarly sophisticated system exists for providing comparable functionality in relation to multimedia resources, such as audio or video files. In some cases, metadata associated with a multimedia resource, such as a title and/or brief description of the content, may enable the resource to be identified as being of potential interest using text-based search systems. However, such limited information does not enable specific portions of the multimedia content to be identified and accessed, based upon a user search.

Accordingly, it is typical that users now seeking information within multimedia resources, such as video files, will need to review the entire content in order to identify portions of particular interest. This generally involves listening to, or viewing, the multimedia content in its entirety. While it may be possible to fast-forward through segments of no interest, and to rewind and review segments of particular interest, this process is substantially passive, linear, and relatively time-intensive.

In cases in which a user may be aware of a particular multimedia content file that contains information of interest, it is presently up to the user to remember, or record, the location within the multimedia content at which the interesting information is located. If the precise time of the required passage is not known, a manual search, via fast-forward/rewind/play, may be necessary in order to find the content of interest. This task becomes more time-consuming if the user is unable to recall which multimedia file of a collection of related files contains the specific content of interest.

As multimedia content becomes increasingly prevalent as a source of critical information to users, both in their personal and business lives, more precise methods for searching and retrieving information from multimedia files will be required.

An emerging solution to this problem involves the provision of textual information that is associated with a corresponding multimedia content file. For example, a video file may have associated with it a transcript, commentary, or other text description corresponding with sequences within the video content. The text may be searchable, enabling more detailed identification of the content of the video file. While this partially addresses user needs, it remains desirable to associate particular passages within the textual description with corresponding sequences, time intervals and/or cue points within the video content.

Known methods have been implemented for associating text with content within a multimedia file. In one approach, the video file is modified so as to embed time cues therein. This enables external programs to re-cue the video playback on demand to the designated points. These points may then be associated with a corresponding textual description. The video content corresponding with a particular passage in the description may be replayed by cueing the video file to the closest embedded time cue. In another known method, an additional file is created (known as a concordance file) which contains references to positions within the textual file and corresponding references to elapsed time within the associated video file. These known methods are reasonably practical, e.g., for applications not requiring changes to the textual description file. If the text is to be edited, these methods either reprocess the video file, in order to update embedded time cues, or reprocess the concordance file, in order to update the corresponding references to both the description and video files.

There remains a need for improved and/or alternative methods and apparatus for searching and accessing information content within multimedia files.

SUMMARY OF THE INVENTION

Aspects of the present invention are directed to addressing the above shortcomings of such known approaches and providing alternative methods and apparatus for searching and accessing information content within multimedia files.

Specific aspects of the present invention are directed to handling a situation in which it is desired to associate multiple textual descriptions with a single multimedia content file. For example, one feature of the present invention is useful, in some circumstances, to associate both a transcript and a commentary with a single video file. Alternatively, it may be desired to associate multiple description files, in different languages, with a single multimedia file. A single set of embedded time cues may not be adequate to meet the requirements of multiple associated description files. Certain aspects are directed to applications for which multiple versions of the video file and/or multiple concordance files may be required.

According to one aspect, the present invention provides a method of synchronising a multimedia content file with an associated text file, the method including the steps of:

subdividing the text file into one or more samples, each sample including zero or more consecutive characters of the text file, wherein each sample is associated with a corresponding contiguous time interval of the multimedia content file;

determining, for each sample, a corresponding consumption rate value, representing a use ratio of characters of the sample within the associated time interval of the multimedia content file; and storing the consumption rate values within the text file, or within another file or record associated with the text file, whereby one or more of the consumption rate values may subsequently be used to compute a time position within the multimedia content file which is proximate to one or more corresponding text characters within the associated text file.

Advantageously, specific implementations can be practiced to enable a concordance between the text file and the multimedia content file to be maintained without the need to embed cues within the multimedia content file, or to maintain a separate file or other record containing interdependent references to both the text file and the multimedia content file. Rather, information utilised by methods embodying the invention relates to the text file only, and may be stored within the text file itself, or within an associated file or other storage, such as a field of a corresponding database record.

A further advantageous feature of the invention is that the text file may be edited, independently of the multimedia content, and the consumption rate values may be recomputed without the need to modify the multimedia content file, or to perform any other reprocessing of additional files or information dependent upon the multimedia content file.

Furthermore, multiple text files may be associated with a single multimedia content file, each having its own set of independent associated consumption rate values which may be used to compute corresponding time positions within the single multimedia content file.

These multiple content files may be stored and presented in any language using different character sets including those used for Latin based (English, French), Chinese, Japanese, Korean, Sanskrit, Hebrew, Cyrillic or Arabic languages.

In certain specific embodiments, the method may include providing one or more additional time values which augment the consumption rate values, whereby the time position within the multimedia content file may be more accurately computed. For example, the additional time values may include interlude values, representing a corresponding contiguous time interval within the multimedia content file, with which no characters of the text file are associated. The interlude values may be embedded at corresponding positions within the text file, or may be stored along with the associated consumption rate values. The interlude values may alternatively, or additionally, be converted into equivalent numbers of interlude characters within the text file, and the consumption rate values may be adjusted to account for the additional interlude characters.

The additional time values may further include time cue values, each of which represents a predetermined time position within the multimedia content file. For example, it may be desired to associate a particular character, or group of characters, within the text file with a corresponding time position within the multimedia content file, and the inclusion of a time cue value enables this to be achieved. For certain applications, any time cue values are stored along with the consumption rate values, and are utilised in the calculation of the consumption rate values prior to and subsequent to the time cue position.

While the samples into which the text file is subdivided may each contain an equal, or approximately equal, number of characters, it may be preferable to subdivide the text file into samples of unequal length. In particular, time cue values may be used to define at least one of the samples into which the text is subdivided. Using time cue values as a basis for subdivision of the text may be particularly advantageous if a number of real-time cues are provided, which are distributed over the duration of the multimedia content.

In accordance with certain specific embodiments of the invention, in the event that the content of the text file is modified, the method includes recalculating the consumption rate values in order to maintain correspondence between the samples and associated contiguous time intervals of the multimedia content file. For example, modification of the text file to add characters within a particular sample, or group of samples, will generally result in an increase in the associated consumption rate values. Similarly, modification of the text file to reduce the number of characters within a particular sample, or group of samples, will generally result in a decrease in the corresponding consumption rate values. It will be appreciated, therefore, that no modifications to the multimedia content file, or any separate file dependent upon the multimedia content file, are necessary in order to maintain concordance between the text file and the multimedia content file.

In another aspect, the invention provides a method of cueing playback of a multimedia content file to a time position which is proximate to one or more selected text characters in an associated text file, the method including the steps of:

providing a series of one or more consumption rate values associated with corresponding samples of the text file, wherein each sample includes zero or more consecutive characters of the text file, and is associated with a corresponding contiguous time interval of the multimedia content file, and wherein each consumption rate value represents a use ratio of characters of the sample within the associated time interval of the multimedia content file;

using one or more of the consumption rate values to compute a time position within the multimedia content file which is proximate to at least one of the selected text characters; and cueing playback of the multimedia content file to commence substantially at the computed time position.

Methods in accordance with the invention may further include, during playback of the multimedia content file, tracking a corresponding location within the associated text file by the steps of:

computing multiple time positions within the multimedia content file corresponding with selected characters within the text file; and tracking the passage of the selected characters as each computed time portion passes during playback of the multimedia content file.

For example, the text file may be formatted into a series of lines of text, and the selected characters within the text file may correspond with characters at the start of each line, whereby the tracking of the location within the text file may be performed on a line-by-line basis. The method may also include generating a list of contiguous time cues each of which corresponds to part of the associated text file. The computed time cues may be displayed in an adjacent pane synchronised with the display of the characters of text at the start of each line so as to provide a convenient approach of replaying the multimedia file from the selected time cue.

Tracking of a location within the text file may further include simultaneously displaying at least a portion of the text file during playback of the multimedia content file, wherein the displayed portion is updated in real time, such that one or more selected characters associated with a computed time portion proximate to a current playback time is included within the display.

For example, a portion of the text file may be displayed within a window or pane adjacent to a window or pane in which the multimedia content file is playing, and the text may be scrolled within its window or pane in order to maintain a display of a portion of the text corresponding with the current playback time. Such scrolling may be manual, or may advantageously be performed automatically so as to maintain a relationship between the current context of the multimedia file, e.g., video, and the content text at a particular point within the scrollable area. Tracking the current playback location within the text file may be enhanced by highlighting the characters or the background colour of the text file or a group of contiguous time cues corresponding to a period of time bracketing the current playback time, for example from two or three seconds before the current playback time to two or three seconds after the current playback time In a method of cueing playback in accordance with the present invention, the method may include identifying the one or more selected text characters by a user conducting a search for a specified text pattern within the text file. That is, the user may conduct, for example, a keyword search, encompassing a single text file, or multiple text files associated with corresponding multimedia content files, in order to identify passages of interest. An identified character, word or phrase within the search results may be selected, and a corresponding multimedia content file cued to commence playback substantially at the corresponding time position.

In particularly certain specific embodiments, the user is enabled to identify the selected text characters via a user interface. Typically, this may be a graphical user interface, wherein the user may identify and select text using a pointing device.

In another aspect, the invention provides an apparatus for synchronising a multimedia content file with an associated text file, the apparatus including:

one or more associated storage devices containing at least the multimedia content file and the associated text file;

means for subdividing the text file into one or more samples, each sample include zero or more consecutive characters of the text file, wherein each sample is associated with a corresponding contiguous time interval of the multimedia content file;

means for determining, for each sample, a corresponding consumption rate value representing a use ratio of characters of the sample within the associated time interval of the multimedia content file; and means for storing the consumption rate values within the text file, or within another file or record associated with the text file, whereby one or more of the consumption rate values may subsequently be used to compute a time position within the multimedia content file which is proximate to one or more corresponding text characters within the associated text file.

In yet another aspect, the invention provides an apparatus for cueing playback of a multimedia content file to a time position which is proximate to one or more selected text characters in an associated text file, the apparatus including:

one or more associated storage devices containing at least the multimedia content file, the associated text file, and a series of one or more consumption rate values associated with corresponding samples of the text file, wherein each sample includes zero or more consecutive characters of the text file, and is associated with a corresponding contiguous time interval of the multimedia content file, and wherein each consumption rate value represents a use ratio of characters of the sample within the associated time interval of the multimedia content file;

means for computing, using one or more of the consumption rate values, a time position within the multimedia content file which is proximate to at least one of the selected text characters; and means for playing back the multimedia content file, configured to cue playback so as to commence substantially at the computed time position.

In a certain specific embodiment of the invention, an apparatus for synchronising a multimedia content file within an associated text file includes:

a central processing unit;

at least one memory device operatively associated with the central processing unit; and one or more storage devices operatively associated with the central processing unit, the storage devices containing at least the multimedia content file and the associated text file, wherein the memory device has computer-executable instructions stored thereon which, when executed by the central processing unit, cause the apparatus to effect the steps of:

subdividing the text file into one or more samples, each sample including zero or more consecutive characters of the text file, wherein each sample is associated with a corresponding contiguous time interval of the multimedia content file;

determining, for each sample, a corresponding consumption rate value representing a use ratio of characters of the sample within the associated time interval of the multimedia content file; and storing the consumption rate values within the text file, or within another file or record associated with the text file, whereby one or more of the consumption rate values may subsequently be used to compute a time position within the multimedia content file which is proximate to one or more corresponding text characters within the associated text files.

In a certain specific embodiment, an apparatus for cueing playback of a multimedia content file includes:

a central processing unit;

at least one memory device operatively associated with the central processing unit;

one or more storage devices containing at least the multimedia content file, the associated text file, and a series of one or more consumption rate values associated with corresponding samples of the text file, wherein each sample includes zero or more consecutive characters of the text file, and is associated with a corresponding contiguous time interval of the multimedia content file, and wherein each consumption rate value represents a use ratio of characters of the sample within the associated time interval of the multimedia content file; and a peripheral interface operatively associated with the central processing unit, which is configured to enable playback of the multimedia content file, wherein the memory device has computer-executable instructions stored thereon, which, when executed by the central processing unit, cause the apparatus to effect the steps of:

using one or more of the consumption rate values to compute a time position within the multimedia content file which is proximate to at least one of the selected text characters; and cueing playback of the multimedia content file to commence substantially at the computed time position.

In certain specific embodiments, the peripheral interface includes audio and/or visual output interfaces via which the multimedia content file may be reproduced. Alternatively or additionally, the peripheral interface may include a network interface, via which the multimedia content file may be streamed to a remotely located computer or other reproduction device, via a communications network.

Further features and advantages will be apparent to those skilled in the art from the following detailed description, which should not be considered to be limiting of the scope of the invention as defined in the preceding statements, or in the claims appended hereto.

BRIEF DESCRIPTION OF THE DRAWINGS

Example embodiments of the invention are described with reference to the accompanying drawings, wherein.

DETAILED DESCRIPTION

Figure 1:
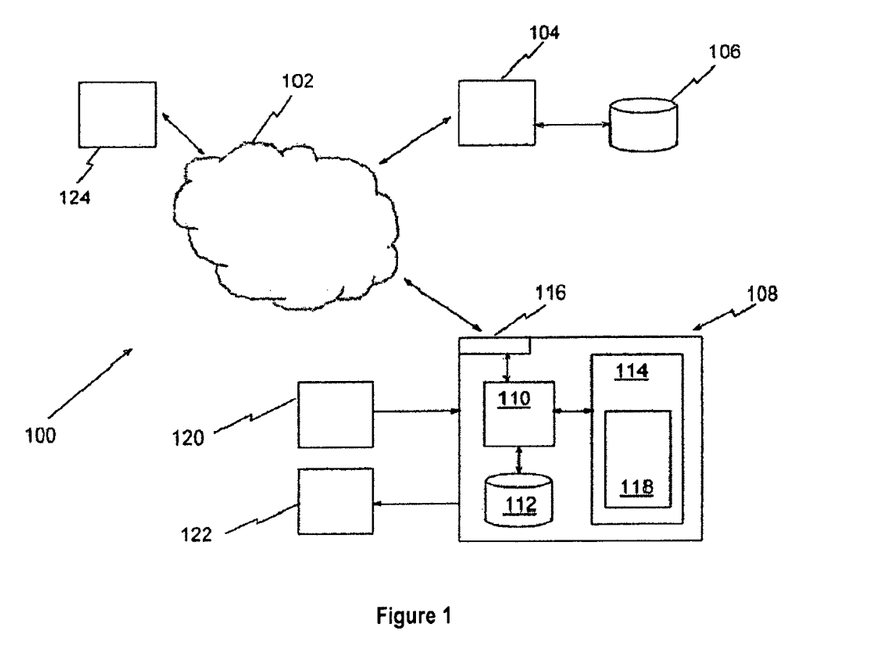
FIG. 1 is a schematic diagram of an Internet-based system embodying the present invention.

FIG. 1 illustrates schematically an Internet-based system 100 which is useful for discussing an exemplary embodiment of the present invention. The system 100 is interconnected via the Internet 102. More particularly, the system 100 includes a server computer 104, which is accessible via the Internet 102 from globally located user computers, e.g., 108.

The server computer 104 includes, or is associated with, a high-capacity, non-volatile memory/storage device 106, such as one or more hard-disk drives. The storage device 106 is used to maintain downloadable information, data and other content, such as Web pages, text files, and downloadable and/or streaming multimedia content, such as video and audio files. The storage device 106 may also contain other programs and data required for the operation of the computer server 104, as is well-known in the art.

In this exemplary environment provided by the system 100, an arrangement of data-processing circuits (e.g., logic and/or computer circuitry) can be configured to implement a method of synchronising a multimedia content file with an associated text file. As a specific example in the system 100, user computer 108 is configured to perform a particular method thereof. The method includes the following steps: subdividing the text file into one or more samples, each sample including zero or more consecutive characters of the text file, wherein each sample is associated with a corresponding contiguous time interval of the multimedia content file; and determining, for each sample, a corresponding consumption rate value, representing a use ratio of characters of the sample within the associated time interval of the multimedia content file; and storing the consumption rate values within the text file, or within another file or record associated with the text file. In this manner, at least one of the consumption rate values may subsequently be used to compute a time position within the multimedia content file which is proximate to one or more corresponding text characters within the associated text file. As would be appreciated by the skilled artisan, these steps can be implemented by software/hardware programming one or more data-processing circuits via, among other forms, computer-executable memory instructions, discrete and/or semi-programmable logic circuitry, and in a single module or separately-situated modules.

Further aspects and details of an exemplary user computer 108 are also illustrated in the system 100 of FIG. 1. In particular, user computer 108 includes at least one processor 110, which is interfaced to, or otherwise associated with, a non-volatile memory/storage device 112, such as a hard-disk drive. The computer 108 also includes volatile storage 114, such as random access memory, for containing program instructions and transient data relating to the operation of the computer 108. In a conventional configuration, the storage device 112 maintains known program and data content relevant to the normal operation of the computer 108. For example, the storage device 112 may contain operating system programs and data, as well as executable Web browser application software for accessing Web servers, e.g., 104, via a network interface 116, which is operatively associated with the processor 110. In particular, the storage device 112 contains programs and data enabling playback of multimedia content. These may include, for example, media player applications and/or other executable components for reproduction of digital multimedia content, such as Flash video (in the .flv format), Windows Media files (in the .wmv format), MPEG audio (e.g., MP3) and video files, AVI files, and/or other types of multimedia content files. It will be appreciated that this is not an exhaustive list of multimedia content types, which is provided by way of example only, and without limitation to the scope of the invention.

Additional software components, embodying aspects of the present invention, may be stored on storage devices 106, 112, for execution by the server computer 104, and/or the user computer 108. Relevant software components for execution on the user computer 108 may also be downloaded via the Internet 102 from the server computer 104, or from other servers connected to the Internet 102. The various arrangements for provision and installation of suitable software components are well-known to persons skilled in the art.

Accordingly, the memory 114 contains a body of program instructions 118 for execution by the processor 110, which may include instructions implementing operating system functions, user interface functions, various conventional software application functions, as well as additional functions and operations embodying aspects of the present invention.

The user computer 108 further includes user interface devices operatively associated with the processor 110. The user interface devices typically include at least one associated user input device 120, such as a keyboard and/or mouse, enabling a user to operate the system. A display device 122 provides visual output to the user.

Also shown in the system 100 illustrated in FIG. 1 is a search server 124, which is accessible via the Internet 102. The search server provides Web search services, enabling a user of the computer 108 to search the World Wide Web for information and content of interest, typically utilising a keyword-type search system. Assuming that the server 104 publishes content stored on the storage medium 106 for indexing by search engines, such as that operated by search server 124, a user will be able to find content of interest published by the server 104 utilising the search engine 124. The server 104 may also provide a corresponding search service, covering the content stored on the storage device 106 and made available via the Internet 102.

The foregoing provides a general overview of the system 100 within which the present invention may be embodied. As will be appreciated, various conventional software and hardware components facilitating the operation of the server computer 104, the user computer 108, and the search server 124, are well-known in the prior art, and accordingly the remainder of this specification will focus primarily upon aspects of operation of the system 100 that are of particular interest in discussing certain aspects of the present invention.

Furthermore, it will be appreciated that while an Internet-based implementation of the invention offers particular advantages, insofar as relevant multimedia content may be made globally available and searchable, alternative implementations are also possible. For example, relevant multimedia content may be distributed, either via the Internet 102 or utilising other media, such as CD-ROM or DVD-ROM, for local access via the user computer 108. In such embodiments, all of the relevant content and associated information will be available locally, for example via the storage device 112, or via an additional non-volatile storage/reproduction device (not shown), such as a CD-ROM or DVD-ROM drive. In this case, connection of the user computer 108 to the Internet 102 will not be required. That is to say, the invention may generally be implemented either in an on-line or an off-line environment.

In accordance with embodiments of the present invention, there are provided multimedia content files, such as audio or video files in various formats, as previously discussed. Associated with each such multimedia content file there is at least one associated text file. The associated text file contains text having a predetermined relationship with the multimedia content file. For example, the associated text file may be a transcript of speech or dialogue within the multimedia content file. Alternatively, the text file may contain a commentary in relation to the multimedia content. In still further cases, the text file may contain a translation of speech or dialogue appearing in the multimedia content file or a text file that is simply descriptive of the content of the multimedia file at various points in time. These examples are not to be considered in any way limiting. In general, the associated text file may contain any textual content having a temporal relationship with the content of the multimedia file. That is, the content of the associated text file is a series of characters, words or phrases wherein particular sequential portions of the text have a concordance with corresponding sequential time intervals of the multimedia content file.

Figure 2A:
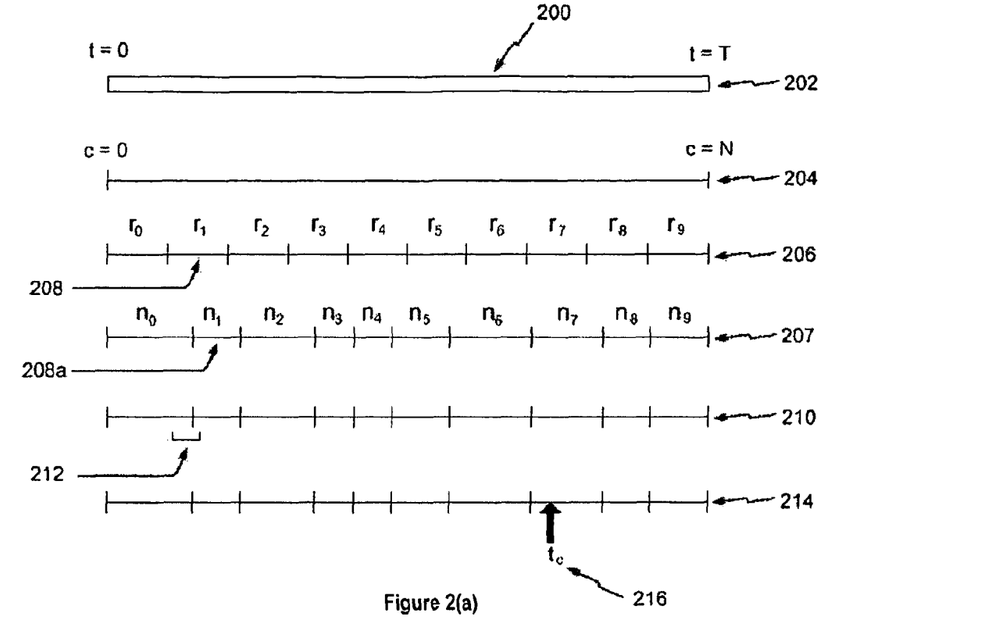
FIG. 2(a) illustrates schematically a first example of a method of synchronising a multimedia content file with an associated text file, in accordance with one embodiment of the invention.

The relationship between the multimedia content and the text file content is illustrated more particularly in FIG. 2(*a*), which contains a series of diagrams 200 illustrating schematically a method of synchronising a multimedia content file with an associated text file. In the example 200 illustrated in FIG. 2(*a*), the multimedia content file is assumed to be a video file, however it will be appreciated that this is in no way limiting of the scope of application of the invention.

The video file is represented by a bar 202, which reflects an overall playback time of the video content. In particular, the beginning of the video file is represented by time t=0, while the end of the video file is represented by time t=T, wherein T represents the total duration of video playback at normal speed.

Below the bar 202 representing the video file is a further bar 204, which represents the corresponding associated text file. As will be appreciated, whereas it is characteristic of multimedia content that a temporal relationship exists between different portions of the file, there is no necessary notion of time associated with a text file. Rather, in accordance with embodiments of the present invention, the text file is treated as a sequence of characters, beginning with a character c=0 and continuing through to a final character c=N, wherein N is the total number of characters contained within the text file.

The methods employed, in preferred embodiments of the invention, for synchronising the text file 204 with the video file 202, will now be described. Firstly, the text file is subdivided into one or more samples, wherein each sample includes zero or more consecutive characters of the text file. In accordance with some embodiments, it may be considered convenient initially to divide the text into samples containing an equal, or approximately equal, number of characters. In other embodiments, the divisions may be unequal provided that the end point of each division is associated with a sequential text character position and a corresponding time position in the multimedia file. This is illustrated by the subdivided bar 206 in the illustration 200. Each sample, e.g., sample 208, is assumed to be associated with a corresponding contiguous time interval of the video file 202. It will be appreciated that each such interval, even when initially corresponding conveniently with a substantially equal number of characters of the text file, will not generally be of equal duration. Indeed, the appropriate durations of the time intervals need not be known initially, and in some embodiments may never be explicitly determined. Further, it is initially assumed that the N characters within the text file 204 cover the total duration T of the video file 202. There is thereby associated with the text file 204 an overall average rate of "character consumption" given by $R=N/T$ (having units of characters per second), or equivalently by its reciprocal $R^{-1}=T/N$ (having units of seconds per character).

For each sample, e.g., 208, of the text file 204, there is then determined a corresponding consumption rate value corresponding with the indices $r_0$, $r_1$ and so forth, associated with samples of the subdivided text bar 206 of FIG. 2(*a*). Each consumption rate value represents a use ratio of characters of the corresponding sample within the associated time interval of the video file 202. For convenience, the consumption rate values are normalised to the average consumption rate R, such that if the rate of consumption of characters within a single interval, such as the rate $r_1$ within interval 208, is equal to the average rate R, then the corresponding consumption rate value is $r_1=1$.

If the rate of consumption of characters within a particular sample is lower than the overall average consumption rate, then the corresponding consumption rate value will be less than 1. Conversely, if the rate of consumption of characters within a particular sample is greater than the overall average rate R, then the consumption rate value within that sample will be greater than 1. As will be appreciated, the rate of character consumption within each sample is dependent upon the corresponding use of character content in the video. For example, if the text file is a transcript of dialogue in the video file, then a period of relative silence, or slow speech, will be associated with one or more samples having a lower consumption rate value. Alternatively, a period of rapid-fire dialogue will most likely be associated with one or more samples of the text file having a higher consumption rate value.

This is shown in the example text bar 207, where the different widths of the intervals $n_0$, $n_1$, $n_2$ and so forth, represent the relative consumption rates of the same number of characters of text within each interval while the consumption of video playback (202) proceeds at the standard rate of one second per second.

Various techniques may be utilised in order to determine the consumption rate values for each sample of the text file. In many cases, an initial assumption that the text is consumed at an approximately constant rate (i.e., r=1) throughout the video content may produce a reasonably accurate result. This will be the case, for example, where the text file is a transcript of the video content, and the video file contains fairly consistent/uniform speech or dialogue.

In other cases, it will be necessary to adapt the consumption rate values associated with various samples of the text file, in order to provide a more accurate correlation between the content of the text file, and corresponding time positions within the video file. Various automated, semi-automated and manual techniques may be used to perform such consumption rate value determinations.

For example, in some cases a transcript of a video file, or other multimedia content, may be automatically generated using speech recognition software. In this case, the consumption rates at any time may readily be computed in the course of performing the speech-to-text conversion. The location and duration of interludes having no corresponding associated text may be similarly determined, and incorporated as described in greater detail below. Alternatively, audio processing software may be utilised which is capable of detecting periods of silence or non-speech within the multimedia content, and the total time of interlude detected within any given time interval of the multimedia content file may be assumed to correlate (inversely) with the corresponding consumption rate value. Methods may also be provided to enable a user to enter and/or adjust automatically computed consumption rate values, for example the user may take an action that signals a correspondence between a particular word or place in the text and the current playback time of the multimedia content file, while playing back the file, in order to improve the correlation between the multimedia content and the text file content. Such an action may be used to generate a time cue value that can be incorporated as described in greater detail below.

It should be appreciated, however, that in certain specific embodiments of the invention a very precise concordance between the multimedia, e.g., video, content and the corresponding text file may not necessarily be required. A specific interface arrangement is described later, with reference to FIG. 5, in which the text file is displayed to the user on a line-by-line or page-by-page basis. In such embodiments, so long as it is possible to display the lines of text most closely associated with the current playback position of the multimedia content, it is not necessary that the exact character of the text associated with the current instant of the multimedia playback be identified with precision. It is sufficient that the relevant text is visible to the user at the relevant time. Furthermore, it is generally not desirable to cue the multimedia playback to a precise time instant, or corresponding point in the text, that may be selected by a user. In most cases, for example, the user will prefer to be provided with a few seconds of lead-in time prior to the selected point, in order to establish the context. In these circumstances, it is again unnecessary that the relationship between the multimedia content and the associated text be pinpointed much more accurately than the duration of the typical lead-in time.

Once a set of suitable consumption rate values has been determined, corresponding with each sample of the text file 206, the consumption rate values are stored, for example within a field of a database record relating to the multimedia file, or optionally within the text file itself. In a specific embodiment, the consumption rate values are stored as a comma-separated list of decimal values. In this way, it is not necessary to maintain a link or other relationship to additional storage, and the database record, or the text file itself, contains all of the information necessary to establish synchronisation with its corresponding multimedia content file. It may readily be envisaged, for example, that multimedia content files may be stored within a database, in association with one or more associated text files, and the corresponding groups of consumption rate values. However, it will be appreciated that it is equally possible to store the multimedia files in one network location, the text files in a different network location and the consumption rate values in yet another network location, so long as an association with the text file is maintained.

It will be appreciated from the foregoing discussion that, once the consumption rate values have been determined and stored, they may subsequently readily be used to compute any desired time position within the multimedia content file which is proximate to any one or more corresponding text characters within the text file. For example, given all of the known consumption rate values, and a particular selected character within the text file, a time position within the corresponding multimedia (e.g., video) content file may be calculated. More specifically, the total time interval corresponding with each text sample, e.g., 208 or 208a, is obtained by dividing the corresponding consumption rate value by the overall average rate R. These time intervals may be accumulated, either starting from the beginning or from the end of the text file 206, until the interval containing the selected character is reached. An approximate time position is given by the resulting computed start- or end-time corresponding with the selected sample. This may then be refined by utilising the relevant rate of the selected sample, and the relative location of the selected character within the sample. Having thus determined the corresponding time position, playback of the video content may be cued to the appropriate time.

In accordance with preferred embodiments of the invention, facility is provided to include additional time values associated with the text file, in order to augment the consumption rate values, and enable more accurate computation of the corresponding time positions within the multimedia content file. The use of two types of such additional time values will now be explained, with reference to the additional bars 210, 214 in the illustration 200 of FIG. 2(a).

Figure 2B:
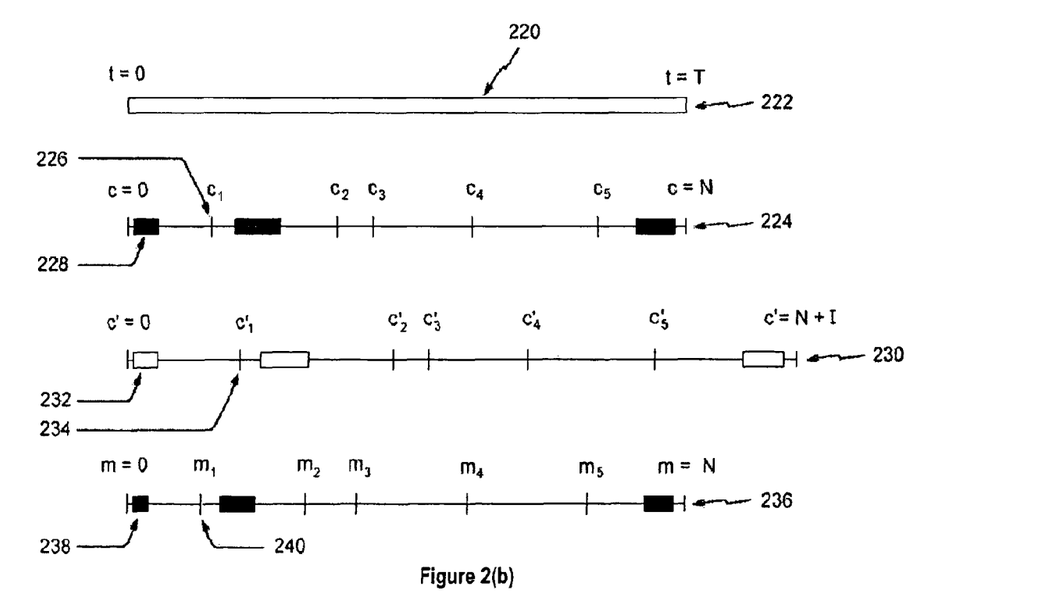
FIG. 2(b) illustrates a second example, in which the text file includes time cue values and interlude values.

The first type of additional time value is an interlude value, which represents a corresponding contiguous time interval within the video content file 202 with which no characters of the text file are associated. This is represented by the interval 212, associated with the time bar 210. Inclusion of an interlude value e.g., 212, may be advantageous during periods when there is no particular correspondence between the video 202 and the text 204, such as an extended period of silence, a break in commentary or dialogue, a musical interlude, and so forth. While this situation may equally be handled by having a sample, e.g., 208, with a particularly low associated rated, e.g., $n_1$, characters appearing within such a sample may exhibit a poor correlation with the corresponding interval of the video, unless a very large number of samples are used. To avoid this, certain specific embodiments of the invention enable an interlude value 212 to be associated with the text 210. In one specific implementation, an interlude value may be inserted directly into the text, as a number of seconds, in decimal format, contained within appropriate delimiters. Suitable delimiters may be characters such as braces, square brackets, or the "pipe" symbol ("|"), however any appropriate characters may be used that can be distinguished from ordinary text. The inserted interlude value indicates a corresponding period of "zero character consumption" between the characters adjacent to the inserted interlude value. This may then readily be taken into account when computing a corresponding consumption rate value, e.g., $r_1$, for the relevant sample. The interlude value is also used when computing a time position associated with any character in the text file 210, which appears after the interlude 212. Furthermore, during playback of the video file 202 and simultaneous display of corresponding text (as described below with reference to FIG. 5), consumption of text is paused during the consumption of the interlude interval 212. As discussed in greater detail below, with reference to FIG. 2(*b*), where interlude values are included, the value of the average rate of consumption R may be revised and the modified R rate is then the total number of characters divided by the total duration less the total interlude duration L such that $R'=N/(T-L)$.

It will be appreciated that alternative implementations of added interlude values are also possible. For example, an interlude value, corresponding with the interval 212, may equally be represented by a pair of numbers, representing the character position c within the text file 204, and the duration of the interlude 212. Pairs of delimited interlude durations and corresponding character positions may be included at the end of the text file, or in a separate file or record, along with the associated consumption rate values. For example, in a certain specific embodiment, pairs of interlude character positions $c_n$ (integers) and corresponding durations in (decimal values, in seconds for example) are collected into a concatenated string having the format "$i_0$~$c_0$|$i_1$~$c_1$| . . . |$i_n$~$c_n$| . . . ", wherein the characters "~" and "|" are used as delimiters which may be replaced with alternative suitable characters if desired. It will be appreciated, however, that numerous alternative formats may be utilised.

In one particular implementation, it is convenient to convert the interlude values into an equivalent number of characters, e.g., using the appropriate consumption rate value(s). The effective number of characters in a corresponding sample of the text file is thereby increased, and an adjusted consumption rate value R' may accordingly be computed. It will be noted that this process results in a change in the number of (effective) characters within the samples, and thus even if samples are initially taken having equal numbers of characters, these may subsequently be modified to produce samples of unequal sizes. One such implementation is described in greater detail with reference to FIG. 2(*b*).

A further type of additional time value, being a time cue value, is illustrated by the bar 214 in the diagram 200. A particular time cue value is illustrated by the arrow 216, and the time value $t_c$. A time cue value may be used, for example, to compensate for long periods of silence, or periods of extremely slow text consumption, which may result in a loss of effective synchronisation between the video file 202 and the text file 204, unless a very large number of samples is utilised. A time cue value is simply the association of a specific time position within the video file 202 with a specific character c within the text file 214. For this example implementation, the time cue value is stored as this corresponding pair of numerical values, which may be appended to the text file along with the consumption rate values, or stored with the consumption rate values in a separate file or record.

As will be appreciated, the insertion of a time cue value e.g., 216, effectively divides the text file 214 into two portions, i.e., the portion prior to the time cue 216, and the portion following the time cue 216. The consumption rate values for samples prior to the time cue 216 may accordingly be computed given the known time position associated with the time cue. Similarly, the consumption rate values associated with the samples following the time cue value may also be computed on this basis. This procedure is naturally extendable to text files having multiple associated time cue values.

FIG. 2(*b*) includes a further series of diagrams 220, illustrating schematically a second example of a method of synchronising a multimedia content file with an associated text file, in which the text file includes both time cue values and interlude values. The example 220 demonstrates how time cue values may be used to define the samples into which a text file is subdivided, and to improve synchronisation of a multimedia content file with the associated text file.

In particular, the multimedia content file, which again may be a video file, is represented by a bar 222. As previously, the beginning of the video file corresponds with time t=0, while the end of the video file corresponds with time t=T. The bar 224 represents a corresponding text file, treated as a sequence of characters, numbered from c=0 to c=N.

In this example there are also a number of time cues, e.g., 226, and interludes, e.g., 228. In FIG. 2(*b*), each time cue 226 is represented by an equivalent character position $c_i$, and corresponds with an associated time within the video file. Each interlude 228 is represented by a black rectangle, which in the bar 224 reflects the character position corresponding with the commencement of the interlude, and a duration corresponding with a period of time within the video file represented by the bar 222.

The bar 230 represents the effect of replacing the interludes, e.g., 228, with an equivalent number of "interlude characters" within the text file. As such, the effective number of characters within the text file is increased in order to account for the interludes. Characters within the modified text are represented by a modified character position c', which commences at c'=0, and concludes at c'=N+I, where I represents the total number of interlude characters added to the text file. For example, the interlude 228 is represented within the modified text file by the insertion of a sequence of interlude characters 232. As a result, the corresponding character positions $c'_i$ representing positions of the time cues are also shifted within the modified text file. For example, the character position $c_1$ (226) in the original text file corresponds with the modified character position $c'_1$ (234) within the modified text file.

As will be appreciated, the total number of inserted interlude characters I corresponds with the total interlude length L, previously introduced. Accordingly, the effective average rate of consumption of non-interlude characters is correspondingly increased, to the modified rate $R'=N/(T-L)$. It should be noted that this modified rate is also the rate of consumption of the inserted interlude characters, such that the total time for consumption of the (N+I) characters remains T.

The final bar 236 depicted in FIG. 2(*b*) represents a "normalised" equivalent of the bar 230, which has been rescaled in order to once again correspond in length with the bars 222, 224, i.e., the normalisation is with respect to the number of characters (N) in the original text. In this case, each of the original time cues $c_i$ is associated with a corresponding modified time cue $m_i$. For example, the time cue $c_1$ (226) corresponds with modified time cue $m_1$ (240). By dividing the modified time cue positions with the original time cue positions, a corresponding series of quotient values $q_i=m_i/c_i$ is obtained. Each of these quotient values is a number generally slightly greater than or slightly less than 1, which represents a comparison between positions of the same time cues within the original text and the modified text. The quotient values are numbers by which a "raw" character position from the original text (represented by bar 224) may be multiplied in order to produce a corresponding position within the modified text (represented by bar 236). Dividing by the average character consumption rate then gives the adjusted time position of the cue. Corresponding consumption rates may then be determined for each of the (generally unequal) intervals defined by the time cues (within either the original or modified text files, since the relationship between character positions is now determined by the quotient values), in order to synchronise the video and text. Since each of the time cues represents a known correspondence between the text file and the video file, more accurate synchronisation will generally be achieved than via the use of approximately equal-sized samples, as was described with reference to FIG. 2(a), if a sufficient number of real-time cues are provided, suitably distributed over the duration of the video file. Furthermore, the inclusion of the interludes as character equivalents within the divisions, and the use of the interlude adjusted average consumption rate $R'=N/(T-L)$ allow the calculation of more-accurate rates $r_i$ for each division.

Figure 3:
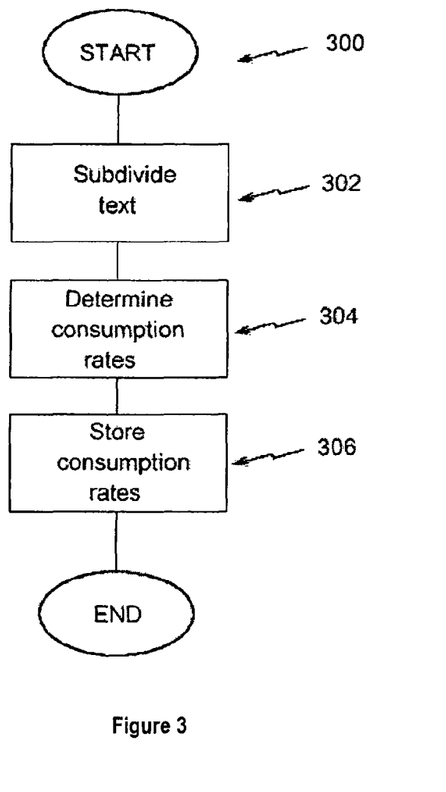
FIG. 3 is a flowchart illustrating steps in the synchronisation method exemplified in FIGS. 2(a) and 2(b)

In view of the foregoing discussion, a general set of steps in the synchronisation method exemplified in FIGS. 2(a) and 2(b) is illustrated by the flowchart 300. More particularly, the general process may be described as follows. Firstly, at step 302 the text file is subdivided into one or more samples, each sample including zero or more consecutive characters of the text file. At step 304 the consumption rate values are determined, in the manner previously described. Finally, at step 306, the computed consumption rate values are stored, optionally within the text file, but alternatively within another file or record associated with the text file. Refinements, such as the insertion of interlude values and time cue values, are also possible.

Figure 4:
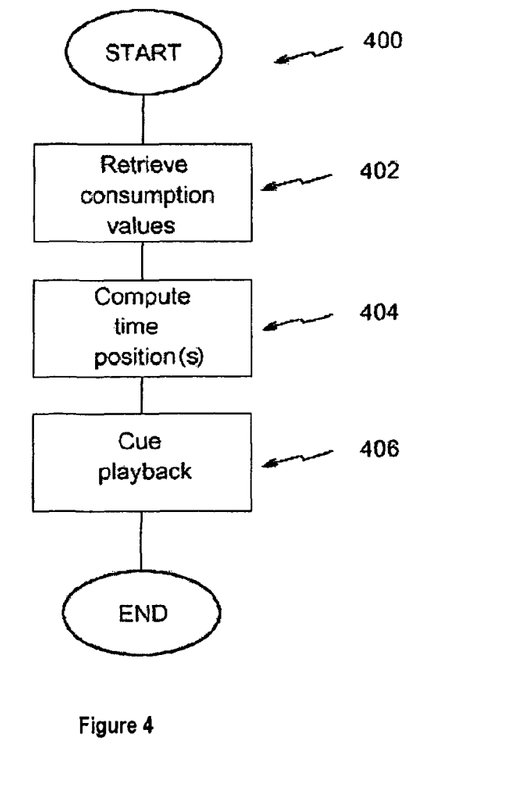
FIG. 4 is a flowchart illustrating steps in a method of cueing playback of a multimedia content file according to a specific embodiment of the invention.

A flowchart 400 illustrating general steps in a method of cueing playback of a multimedia content file according to a certain specific embodiment of the invention is illustrated in FIG. 4. Firstly, at step 402, the consumption rate values (along with any additional time values such as interlude values and time cue values) are provided, in association with the text file. At step 404, time positions within the multimedia content file are computed, corresponding with selected characters, words or phrases within the text file. As described in greater detail below, with reference to FIG. 5, such time positions may correspond with words or characters identified and selected by a user, or may be automatically selected, for example on the basis of a displayed format of the text file. Finally, at step 406, playback of the multimedia content file may be cued to a point corresponding with the selected characters utilising the computed time positions. Relevant methods for computing time positions have been discussed above, with reference to FIGS. 2(a) and 2(b).

Figure 5:
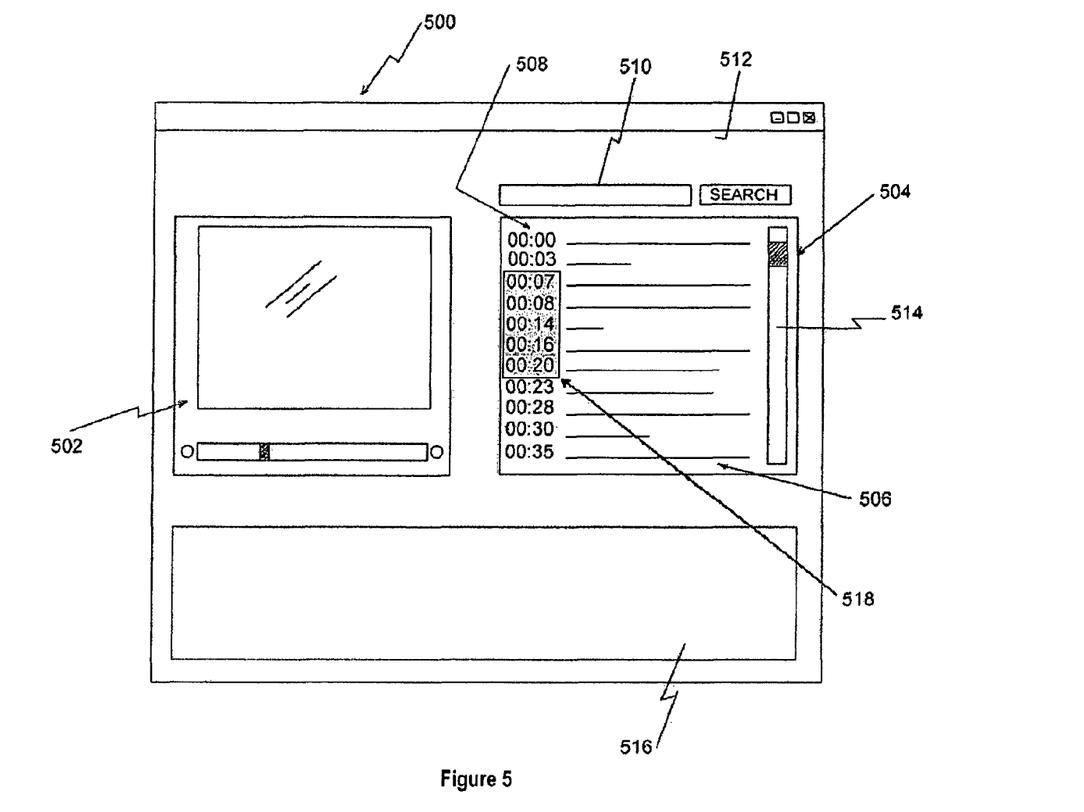
FIG. 5 illustrates schematically a display layout of a user interface according to another aspect of the invention.

Turning now to FIG. 5, there is illustrated schematically a display layout 500 of a user interface according to another aspect of the invention. The display layout 500 includes a window or pane 502, within which the multimedia content file, such as a video file, may be played back. A further window or pane 504, is provided within which the associated text, read from the text file, is displayed. As shown, the text is formatted into a series of lines 506. Wrapping of the lines is determined by the presence of line feed characters within the text file, as well as by the provision of automated line breaks corresponding with the right-hand extent of the display pane 504. Time positions within the multimedia content file are displayed as a column 508 alongside the displayed lines 506 of the text file. The time positions 508 are calculated dynamically when the text file is read and formatted, utilising the consumption rate values and any additional time values, as previously described. For certain applications, each of the time values 508 is an active control, which the user may select (for example using a pointing input device 120) and which will cause the multimedia playback to be cued to the corresponding time position.

Additionally a text entry box 510 is provided, into which the user may enter search terms or keywords. Subsequently selecting the search button 512 will result in the contents of the text 506 being searched for the specified search terms or keywords. Any resulting hits will be highlighted, and optionally also converted into active elements, such that when selected by the user, for example using a pointing device 120, playback of the multimedia content will be cued to a corresponding time position, computed in accordance with the methods previously described. As also previously noted, a lead-in time can be included when cueing playback, in order to provide the user with relevant context. A scrollbar 514 enables the user to scroll through the text independently of the playback of the multimedia content within the pane 502. However, scrolling of the text may also be automated, in order to track the multimedia playback. A highlighted region 518 may also be included which follows the playback of the multimedia file, enhancing the user's experience by facilitating changes of sequential viewing between the multimedia content and the text. Finally, the display layout 500 includes a region 516 in which other controls, information and so forth may be included.

As will be appreciated, the text pane 504 may be part of a dedicated user interface of a multimedia playback application, or may be provided as an embeddable or plug-in control that may be deployed within other interfaces, such as a Web-based interface. For example, a text pane control having the general layout of the pane 504 may be incorporated into a YouTube style of interface.

In other embodiments of the invention where more than one output video display is attached to a presentation computer, the multimedia content may be displayed in full on one video display while the associated content and search capability is provided on the other.

Based on the foregoing description, it will be apparent to persons skilled in the art that various implementations of the invention are possible, particularly within an Internet-based environment such as the system 100 illustrated in FIG. 1. For example, computation of the time positions 508 may be performed either on the server side 104, or on the client side within user computer 108. It will be understood that such variations in implementation do not materially alter the nature of the invention, and all lie within the scope of the invention. It will further be appreciated that, within a Web-based implementation, the complete user interface 500 will typically be provided within a Web browser window. Again, various implementations of such an interface are possible, encompassing server-side components and client-side components such as script elements and browser plug-ins. In Web-based implementations, the active displayed time values 508 may readily be implemented using hyperlinks.

Accordingly, it is to be understood that many variations of the present invention are possible, and the invention is not to be limited to the particular embodiments described herein. Rather, the scope of the invention includes that as defined in the claims appended hereto.

What is claimed is:

1. A method of creating synchronisation information for synchronising a multimedia content file with an associated text file, the method including the steps of:
subdividing the text file into one or more samples, each sample including zero or more consecutive characters of the text file, wherein each sample is associated with a corresponding contiguous time interval of the multimedia content file;
calculating, for each sample, a corresponding consumption rate value, which is a ratio between a total number of characters of the sample and a duration of the associated contiguous time interval of the multimedia content file; and
storing the calculated consumption rate values within a series of one or more synchronisation data records in a file or database separate from the multimedia content file and the associated text file, each record additionally comprising one or more of: a start character offset; a multimedia content file cue time; and an interlude length,
whereby content of one or more of the synchronisation data records may subsequently be used to compute a time position within the multimedia content file which is proximate to any one or more corresponding text characters defined by a character offset within the associated text file.

2. The method of claim 1, further comprising computing a time position within the multimedia content file using the content of the one or more of the synchronisation data records.

3. The method of claim 1 wherein the interlude length represents a corresponding contiguous time interval within the multimedia content file, with which no characters of the text file are associated.

4. The method of claim 3 wherein the interlude length is defined by an equivalent number of characters consumed at the consumption rate stored within the synchronization data record.

5. The method of claim 1 wherein, in the event that the content of the text file is modified, the method includes recalculating at least the consumption rate values in order to maintain correspondence between the samples and associated contiguous time intervals of the multimedia content file.

6. A method of cueing playback of a multimedia content file to a time position which is proximate to any one or more selected text characters defined by a character offset in an associated text file, the method including the steps of:
providing a series of one or more consumption rate values associated with corresponding samples of the text file, wherein each sample includes zero or more consecutive characters of the text file, and is associated with a corresponding contiguous time interval of the multimedia content file, and wherein each consumption rate value is calculated as ratio between a total number of characters of the sample and a duration of the associated contiguous time interval of the multimedia content file;
providing, separately from the multimedia content file and the associated text file, a file or database containing a series of one or more synchronization data records, each of which comprises one of said consumption rate values and one or more of: a start character offset; a multimedia content file cue time; and an interlude length;
using content of one or more of the synchronization data records to compute a time position within the multimedia content file which is proximate to at least one of the selected text characters defined by the character offset; and
cueing playback of the multimedia content file to commence substantially at the computed time position.

7. The method of claim 6 which also includes, during playback of the multimedia content file, tracking a corresponding location within the associated text file by the steps of:
computing multiple time positions within the multimedia content file corresponding with selected characters within the text file; and
tracking the passage of the selected characters as each computed time portion passes during playback of the multimedia content file.

8. The method of claim 6 which also includes simultaneously displaying at least a portion of the text file during playback of the multimedia content file, wherein the displayed portion is updated in real time, such that one or more selected characters associated with a computed time portion proximate to a current playback time is included within the display.

9. The method of claim 6, further including identifying the one or more selected text characters by a user conducting a search for a specified text pattern within the text file.

10. A computer-implemented system for creating synchronization information for synchronising a multimedia content file with an associated text file, the apparatus including:
one or more associated storage devices containing at least the multimedia content file, the associated text file and a separate file or database for containing a series of one or more synchronization data records;
means, for subdividing the text file into one or more samples, each sample include zero or more consecutive characters of the text file, wherein each sample is associated with a corresponding contiguous time interval of the multimedia content file;
means, for calculating, for each sample, a corresponding consumption rate value, which is a ratio between a total number of characters of the sample and a duration of the associated contiguous time interval of the multimedia content file; and
means, for storing the calculated consumption rate values within the series of one or more synchronization data records, each record additionally comprising one or more of: a start character offset a multimedia content file cue time and an interlude length,
whereby content of one or more of the synchronization data records may subsequently be used to compute a time position within the multimedia content file which is proximate to any one or more corresponding text characters defined by a character offset within the associated text file.

11. A computer-implemented system for cueing playback of a multimedia content file to a time position which is proximate to any one or more selected text characters defined by a character offset in an associated text file, the apparatus including:
one or more associated storage devices containing at least the multimedia content file, the associated text file, and a separate file or database containing a series of one or more synchronization data records, each comprising a consumption rate value and one or more of a start character offset, a multimedia content file cue time, and an interlude length, wherein each consumption rate value is associated with a corresponding sample of the text file, wherein each sample includes zero or more consecutive characters of the text file, and is associated with a corresponding contiguous time interval of the multimedia content file, and wherein each consumption rate value is calculated as a ratio between a total number of characters of the sample and a duration of the associated contiguous time interval of the multimedia content file;

means for computing, using content of one or more of the synchronization data records, a time position within the multimedia content file which is proximate to at least one of the selected text characters defined by the character offset; and means for playing back the multimedia content file, configured to cue playback so as to commence substantially at the computed time position.

12. A computer-implemented system for creating synchronization information for synchronising a multimedia content file within an associated text file including:

a central processing circuit;

at least one memory device operatively associated with the central processing circuit; and one or more storage devices operatively associated with the central processing circuit unit, the storage devices containing at least the multimedia content file, the associated text file and a separate file or database for containing a series of one or more synchronisation data records, wherein the memory device has computer-executable instructions stored thereon which, when executed by the central processing circuit, cause the apparatus to effect the steps of:

subdividing the text file into one or more samples, each sample including zero or more consecutive characters of the text file, wherein each sample is associated with a corresponding contiguous time interval of the multimedia content file;

calculating, for each sample, a corresponding consumption rate value, which is a ratio between a total number of characters of the sample and a duration of the associated contiguous time interval of the multimedia content file; and storing the calculated consumption rate values within the synchronization data records, each record additionally comprising one or more of: a start character offset; a multimedia content file cue time; and an interlude length, whereby content of one or more of the synchronization data records may subsequently be used to compute a time position within the multimedia content file which is proximate to any one or more corresponding text characters defined by a character offset within the associated text files.

13. A computer-implemented system for cueing playback of a multimedia content file including:

a central processing circuit;

at least one memory device operatively associated with the central processing circuit;

one or more storage devices containing at least the multimedia content file, an associated text file, and a separate file or database containing a series of one or more synchronization data records, each synchronization data record comprising a consumption rate value and one or more of a start character offset, a multimedia content file cue time, and an interlude length, wherein each consumption rate value is associated with a corresponding sample of the text file, wherein each sample includes zero or more consecutive characters of the text file, and is associated with a corresponding contiguous time interval of the multimedia content file, and wherein each consumption rate value is calculated as a ratio between a total number of characters of the sample and a duration of the associated contiguous time interval of the multimedia content file; and a peripheral interface operatively associated with the central processing circuit, which is configured to enable playback of the multimedia content file, wherein the memory device has computer-executable instructions stored thereon, which, when executed by the central processing circuit, cause the apparatus to effect the steps of:

using content of one or more of the synchronization data records to compute a time position within the multimedia content file which is proximate to at least one of any one or more selected text characters defined by a character offset in the associated text file; and cueing playback of the multimedia content file to commence substantially at the computed time position.

14. The method of claim 6 further including initially creating the synchronisation data records by steps of:

subdividing the text file into one or more samples, each sample including zero or more consecutive characters of the text file, wherein each sample is associated with a corresponding contiguous time interval of the multimedia content file;

calculating, for each sample, a corresponding consumption rate value, which is a ratio between a total number of characters of the sample and a duration of the associated contiguous time interval of the multimedia content file; and storing the calculated consumption rate values within the series of one or more synchronisation data records in the file or database, each record additionally comprising one or more of: a start character offset; a multimedia content file cue time; and an interlude length.

15. A method of search and playback of a multimedia content file, including the steps of:

providing a searchable text file associated with the multimedia content file;

providing a series of one or more consumption rate values associated with corresponding samples of the text file, wherein each sample includes zero or more consecutive characters of the text file, and is associated with a corresponding contiguous time interval of the multimedia content file, and wherein each consumption rate value is calculated as a ratio between a total number of characters of the sample and a duration of the associated contiguous time interval of the multimedia content file;

providing, separately from the multimedia content file and the associated text file, a file or database containing a series of one or more synchronisation data records, each synchronization data record comprising one of said consumption rate values and one or more of: a start character offset; a multimedia content file cue time; and an interlude length;

receiving one or more character offset values within the text file, each of which defines one or more text characters within the text file which have been identified in response to a user search query;

using content of one or more of the synchronisation data records to compute a time position within the multimedia content file which is proximate to at least one of the identified text characters defined by at least one of the character offset values; and cueing playback of the multimedia content file to commence substantially at the computed time position.

16. A computer-implemented system for search and playback of a multimedia content file including:

a central processing circuit;

at least one memory device operatively associated with the central processing circuit;

one or more storage devices containing at least the multimedia content file, an associated text file, and a separate file or database containing a series of one or more synchronization data records, each comprising a consumption rate value and one or more of a start character offset, a multimedia content file cue time, and an interlude length, wherein each consumption rate value is associated with a corresponding sample of the text file, wherein each sample includes zero or more consecutive characters of the text file, and is associated with a corresponding contiguous time interval of the multimedia content file, and wherein each consumption rate value is calculated as a ratio between a total number of characters of the sample and a duration of the associated contiguous time interval of the multimedia content file; and a peripheral interface operatively associated with the central processing circuit, which is configured to enable playback of the multimedia content file, wherein the memory device has computer-executable instructions stored thereon, which, when executed by the central processing circuit, cause the apparatus to effect the steps of:

receiving one or more character offset values within the text file, each of which defines one or more text characters within the text file which have been identified in response to a user search query;

using content of one or more of the synchronization data records to compute a time position within the multimedia content file which is proximate to at least one of the identified text characters defined by at least one of the character offset values; and cueing playback of the multimedia content file to commence substantially at the computed time position.

\* \* \* \* \*

UNITED STATES PATENT AND TRADEMARK OFFICE
CERTIFICATE OF CORRECTION

PATENT NO. : 8,612,384 B2  
APPLICATION NO. : 12/416365  
DATED : December 17, 2013  
INVENTOR(S) : Hall Page 1 of 2

It is certified that error appears in the above-identified patent and that said Letters Patent is hereby corrected as shown below:

<u>In the Claims</u>

Col. 17, line 2, Claim 1: "synchronisation" should read --synchronization--.

Col. 17, line 3, Claim 1: "synchronising" should read --synchronizing--.

Col. 17, line 17, Claim 1: "synchronisation" should read --synchronization--.

Col. 17, line 23, Claim 1: "synchronisation" should read --synchronization--.

Col. 17, line 30, Claim 2: "file using" should read --file, using--.

Col. 17, line 31, Claim 2: "synchronisation" should read --synchronization--.

Col. 17, line 57, Claim 6: "as ratio" should read --as a ratio--.

Col. 18, line 27, Claim 10: "synchronising" should read --synchronizing--.

Col. 18, line 28, Claim 10: "apparatus" should read --system--.

Col. 18, line 34, Claim 10: "include" should read --including--.

Col. 18, line 57, Claim 11: "apparatus" should read --system--.

Col. 18, line 62, Claim 11: "each comprising" should read --each synchronization data record comprising--.

Col. 19, line 16, Claim 12: "synchronising" should read --synchronizing--.

Col. 19, line 25, Claim 12: "synchronisation" should read --synchronization--.

Col. 19, line 28, Claim 12: "apparatus" should read --system--.

Signed and Sealed this  
Twenty-fifth Day of February, 2014

Michelle K. Lee  
*Deputy Director of the United States Patent and Trademark Office*

CERTIFICATE OF CORRECTION (continued)
U.S. Pat. No. 8,612,384 B2

In the Claims

Col. 20, line 11, Claim 13: "apparatus" should read --system--.

Col. 20, line 21, Claim 14: "synchronisation" should read --synchronization--.

Col. 20, line 33, Claim 14: "synchronisation" should read --synchronization--.

Col. 20, line 52, Claim 15: "synchronisation" should read --synchronization--.

Col. 20, line 61, Claim 15: "synchronisation" should read --synchronization--.

Col. 21, line 9, Claim 16: "each comprising" should read --each synchronization data record comprising--.

Col. 22, line 6, Claim 16: "apparatus" should read --system--.